(12) United States Patent
Markussen et al.

(10) Patent No.: US 10,136,760 B2
(45) Date of Patent: Nov. 27, 2018

(54) ROTISSERIE AND GRILL CYLINDRICAL TUMBLER

(71) Applicant: All About BBQ, LLC, Longmont, CO (US)

(72) Inventors: Bradley D Markussen, Longmont, CO (US); Jack D Markussen, Berthoud, CO (US); Vonda J Phipps, Longmont, CO (US); Wesley D Markussen, Loveland, CO (US)

(73) Assignee: ALL ABOUT BBQ, LLC, Longmont, CO (US)

( * ) Notice: Subject to any disclaimer, the term of this patent is extended or adjusted under 35 U.S.C. 154(b) by 0 days.

(21) Appl. No.: 15/530,668

(22) Filed: Aug. 3, 2016

(65) Prior Publication Data

US 2017/0215638 A1 Aug. 3, 2017

Related U.S. Application Data

(60) Provisional application No. 62/200,889, filed on Aug. 4, 2015.

(51) Int. Cl.
| | |
|---|---|
| *A47J 37/04* | (2006.01) |
| *B65F 1/16* | (2006.01) |
| *B65D 25/32* | (2006.01) |
| *A47J 33/00* | (2006.01) |
| *A47J 37/07* | (2006.01) |

(52) U.S. Cl.
CPC ............ *A47J 37/047* (2013.01); *A47J 33/00* (2013.01); *A47J 37/0786* (2013.01); *B65D 25/32* (2013.01); *B65F 1/1615* (2013.01)

(58) Field of Classification Search
CPC ...... A47J 37/047; A47J 37/049; A47J 45/075; B65F 1/1615; B65D 25/32
USPC .......... 99/421 A, 419, 421 H, 427, 441, 450, 99/421 V; 34/63, 108, 109; 220/315, 220/318, 760, 763, 773
See application file for complete search history.

(56) References Cited

U.S. PATENT DOCUMENTS

| | | | | |
|---|---|---|---|---|
| 899,861 | A * | 5/1902 | Wiedenbauer | ................ 220/773 |
| 726,279 | A * | 4/1903 | Giacomini | .............. A23L 7/183 |
| | | | | 34/108 |
| 864,258 | A * | 8/1907 | Weber | ....................... F16H 3/66 |
| | | | | 475/284 |
| 1,625,002 | A * | 4/1927 | Wagner | ................. A61J 9/0646 |
| | | | | 220/23.88 |
| 2,705,450 | A * | 4/1955 | Steinbook | ............. A47J 37/047 |
| | | | | 99/340 |
| 5,497,697 | A * | 3/1996 | Promny | ................. A47J 37/047 |
| | | | | 99/394 |

(Continued)

FOREIGN PATENT DOCUMENTS

CH 603130 * 8/1978 ............ A47J 37/047

*Primary Examiner* — Reginald L Alexander
(74) *Attorney, Agent, or Firm* — Lewis Brisbois Bisgaard & Smith LLP; Ian R. Rainey

(57) ABSTRACT

A cooking device that allows you to BBQ and smoke different foods on a grill is disclosed. The present invention allows for use with or without a rotisserie. It has a locking lid on one end which doubles as a locking mechanism with a handle. Each end has holes to allow for most rotisseries on the market. The holes at both ends of the can are offset. This creates a tumbling effect that helps stir the ingredients when turned.

17 Claims, 4 Drawing Sheets

(56) References Cited

U.S. PATENT DOCUMENTS

| | | | | |
|---|---|---|---|---|
| 5,632,098 A | * | 5/1997 | Finch | A23N 12/10 |
| | | | | 34/63 |
| 5,771,600 A | * | 6/1998 | Romanow | A23N 12/10 |
| | | | | 34/63 |
| 6,220,152 B1 | * | 4/2001 | Baldwin | A47J 37/0694 |
| | | | | 99/419 |

* cited by examiner

ROTISSERIE AND GRILL CYLINDRICAL TUMBLER

CROSS REFERENCE APPLICATIONS

This application is a non-provisional application claiming the benefits of provisional application No. 62/200,889 filed Aug. 4, 2015.

BACKGROUND

Smaller foods are difficult to contain and turn over, or move around on a grill or smoker. Current products on the market are basket configurations and won't hold or contain smaller items like nuts and will not work in conjunction with a rotisserie.

Relevant prior art includes U.S. Pat. No. 2,705,450 (1955) to Steinbrook. He discloses a tubular cylindrical container with fenestrated (mesh-like) sidewalls. The bottom end is closed. The top end is removable. A round spit (rod) passes through holes in the top and bottom that are aligned with the longitudinal axis of the container.

Internal vanes agitate the food product as the container rotates. The top is locked in place by a U shaped clamp and wing screw during use.

U.S. Pat. No. 5,182,981 (1993) to Wilcox discloses a revolving peanut roasting container. A metal, tubular cylindrical drum rotates on a spit in an angled relation to the horizontal. The top of the drum is removable. Internal spiraled vanes agitate the nuts during roasting. Snap clips lock the top drum during use.

U.S. Pat. No. 5,632,098 (1997) to Finch discloses a metal, tubular cylindrical drum with a fixed bottom and removable top. Aligned holes at the longitudinal axis in the top and bottom receive a spit to rotate the drum. The top is locked by a collar and set screw. Internal flanges agitate the food product. The drum sidewalls are mesh-like.

U.S. Pat. No. 5,771,600 (1998) to Romanow discloses a coffee bean roasting drum. A closed, metal, tubular cylindrical drum is rotated by a spit aligned with the longitudinal axis of the drum. The sidewalls are mesh-like with a plurality of holes in a sheet metal wall. A door in the sidewall provides access for the food product. Internal staggered fins agitate the food product during use.

What is needed in the art is a metal cooking drum that is suited to fit on a rotisserie or be placed on a grill or in a smoker. A handle is needed. A cost effective means to agitate is needed, preferably eliminating an internal flange. The present invention provides a handle and lock for the top combination assembly. Off center holes in the top and bottom provide agitation of the food product without internal flanges. A low cost mesh-like sidewall does not need a door since the top is removable.

The present invention allows for use with or without a rotisserie. It has a locking lid on one end which doubles as a locking mechanism and handle. Each end has holes to allow for most rotisseries on the market. The holes at both ends of the can are offset. This creates a tumbling effect that helps stir the ingredients when turned.

SUMMARY OF THE INVENTION

The main aspect of the present invention is to provide a tubular, cylindrical, metal, drum with a fixed bottom and removable top. The sidewalls are mesh-like. The top and bottom have holes offset from a longitudinal axis, thereby providing agitation of a food product during rotisserie use.

Another aspect of the present invention is to provide a U shaped handle that has locking shoulders to secure the top during use.

Another aspect of the present invention is to provide a low cost design including smooth sidewalls without a door or internal flanges.

These and other features and advantages of the present invention reside in the construction of parts and the combination thereof, the mode of operation and use, as will become more apparent from the following description, reference being made to the accompanying drawings that form a part of this specification wherein like reference characters designate corresponding parts in the several views. The embodiments and features thereof are described and illustrated in conjunction with systems, tools and methods which are meant to exemplify and to illustrate, not being limiting in scope.

As stated above, smaller foods are difficult to contain and turn over, or around on a grill or smoker. The invention claimed here solves this problem.

We have developed a perforated canister with one removable end to contain the food product. The canister can be used with a rotisserie, hang or lay flat on a grill and be turned by hand.

The claimed invention differs from what currently exists. The present invention allows for use with or without a rotisserie. It has a locking lid on one end which doubles as a locking mechanism and handle. Each end has holes to allow for most rotisseries on the market. The holes at both ends of the can are offset. This creates a tumbling effect that helps stir the ingredients when turned.

This design can produce great smoked almonds or any nuts as well as other difficult to handle foods on a grill. The version of the invention discussed here includes:
1. Cut and rolled perforated cold roll steel or stainless steel.
2. Two end caps, cold roll or stainless steel with ½ hole.
3. Seam cover
4. Bent wire locking handle.

Relationship Between The Components:
1 perforated steel can is welded together using the #3 seam cover. Then one of the #2 end caps are welded over the outside of the can from the inside. Then the other #2 end cap is a slip fit over the other end of the can. Then the #4 bent wire locking handle is bent and installed using the perforated holes in the steel can.

How The Invention Works:
The locking lid keeps food contained securely and easily. The offset holes in the end caps when used with a rotisserie help rotate or stir the food. The product can be used with a rotisserie or on a grill by itself. Many different food items can be cooked easily in the container.

How To Make The Invention:
This item could be assembled from off the shelf purchased material using mechanical fasteners, offset holes in the end caps and locking caps. A complete draw formed canister using perforated steel could eliminate the need for two end caps. Different sizes to accommodate larger or smaller food quantities are implied herein.

How To Use The Invention:
First season the can for BBQing. Remove the top end cap and fill with desired food. Then place the removable top end cap in place and lock with handle. Place on grill using heat protecting gloves or oven mitt, and rotate by hand as needed or place on rotisserie.

Before explaining the disclosed embodiments in detail, it is to be understood that the embodiments are not limited in application to the details of the particular arrangements shown, since other embodiments are possible. Also, the terminology used herein is for the purpose of description and not of limitation.

DETAILED DESCRIPTION OF THE DRAWINGS

Figure 1:
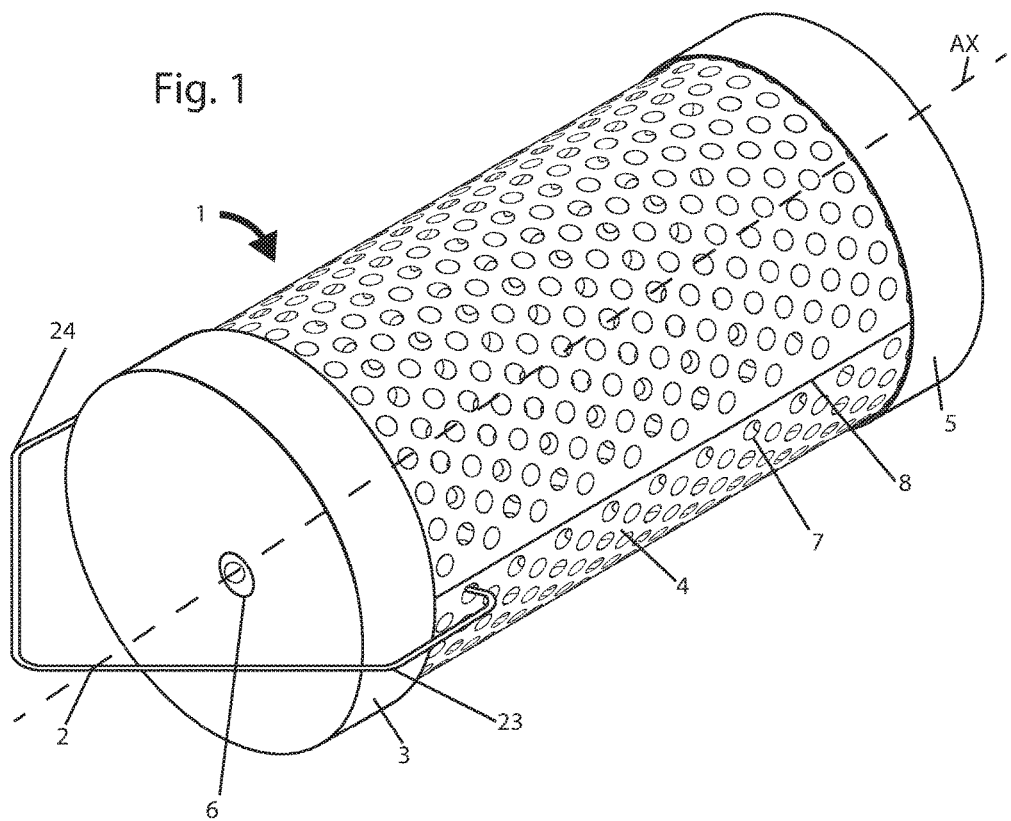
FIG. 1 is a front perspective view of the container in a closed and locked mode.
Figure 2:
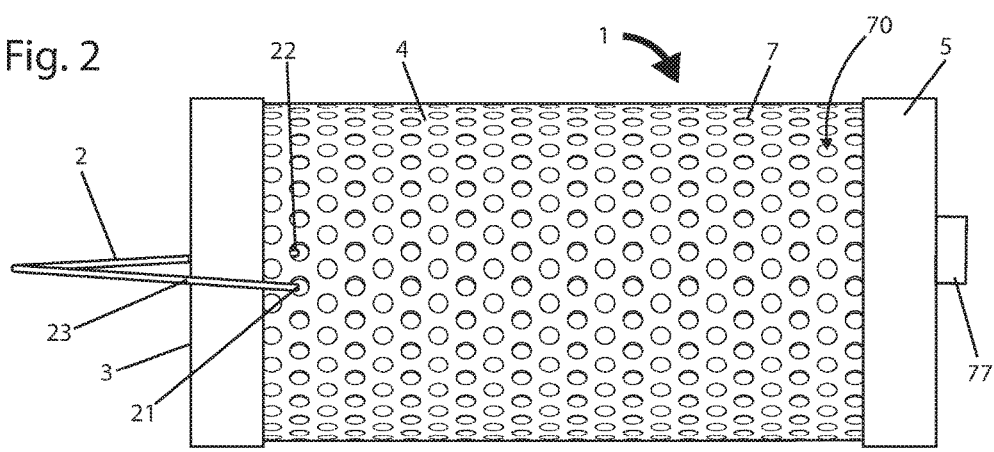
FIG. 2 is a side elevation view showing the U shaped handle with locking shoulders locking the top down.
Figure 3:
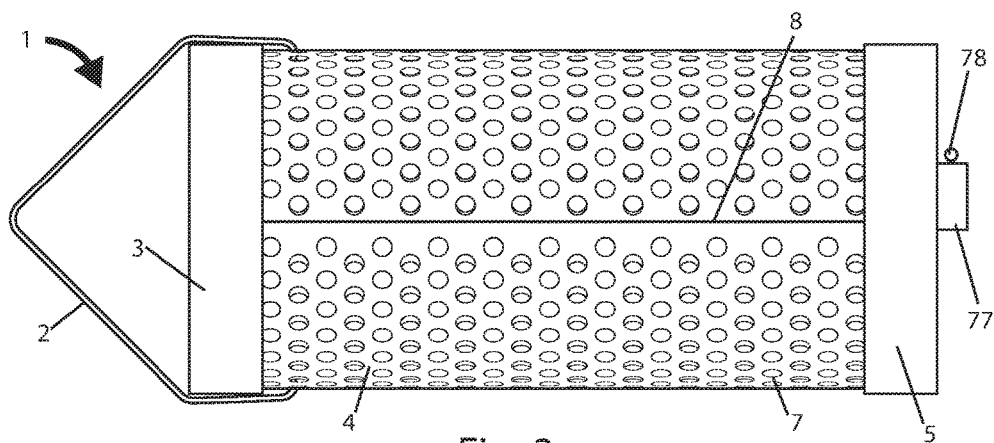
FIG. 3 is a side elevation view of the container showing the sheet metal seem.

Referring first to FIGS. 1, 2 a cooking container 1 has a cylindrical sidewall 4 preferably made of stainless steel. A plurality of holes 7 allow cooking gases to escape during a cooking operation. A joinder seam 8 is known in the art to form the cylindrical shape. A smooth sidewall construction without a door reduces costs. A solid bottom 5 can be friction mounted or welded permanently to the cylindrical sidewall 4.

A solid top 3 is removable to provide access to the hollow cooking chamber 70 formed inside the cylindrical sidewall 4. A handle 2 is preferably a U shaped stainless steel wire having a pivotable anchor 21, 22 on opposing sidewall mounting locations. Handle shoulders 23, 24 lock the top 3 against the upper rim 71 (see FIG. 7) of the cylindrical sidewall only when the handle 2 is aligned with the longitudinal axis AX of the cooking container 1.

Figure 4:
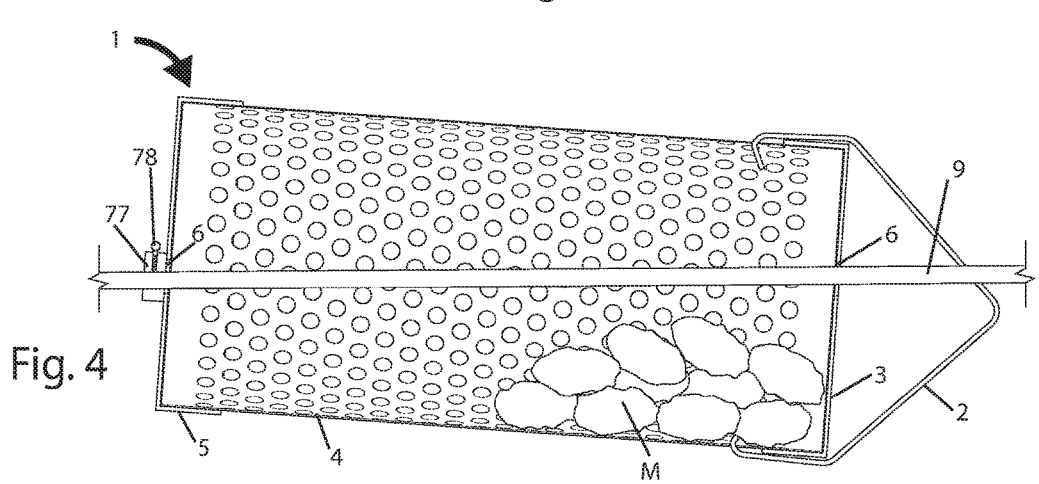
FIG. 4 is a side elevation view of the container with a partial cutaway in use on a grill.

Each of the top 3 and the bottom 5 have an off-center hole 6 for a spit of a rotisserie. This off-center hole(s) 6 provides a shuffling of the food (FIG. 4 item M) as the container 1 is rotated (see FIG. 9). A flange 77 having a set screw 78 allows the user to lock the bottom 5 onto a spit 9 (FIG. 4, 9) during use on a rotisserie. A cost saving is accomplished with this design because no internal baffles are needed to stir the food M.

Figure 5:
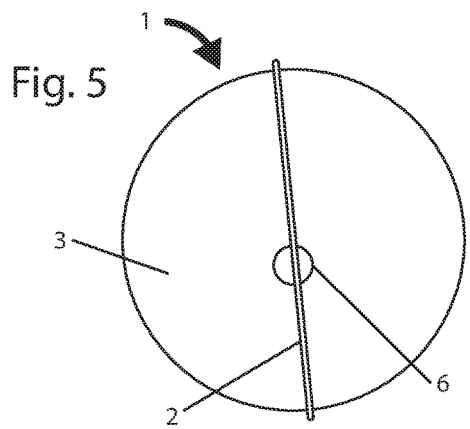
FIG. 5 is a top plan view showing the top and the offset spit hole.
Figure 6:
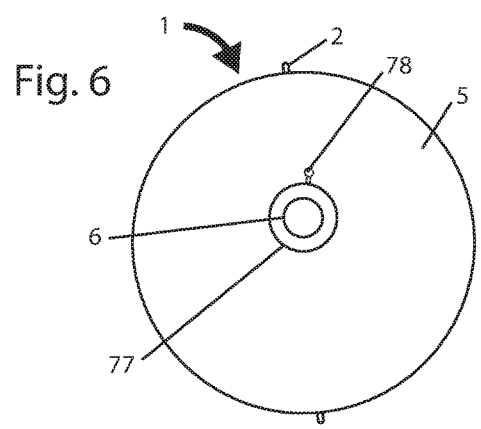
FIG. 6 is a bottom plan view showing the bottom and a locking wing screw.
Figure 7:
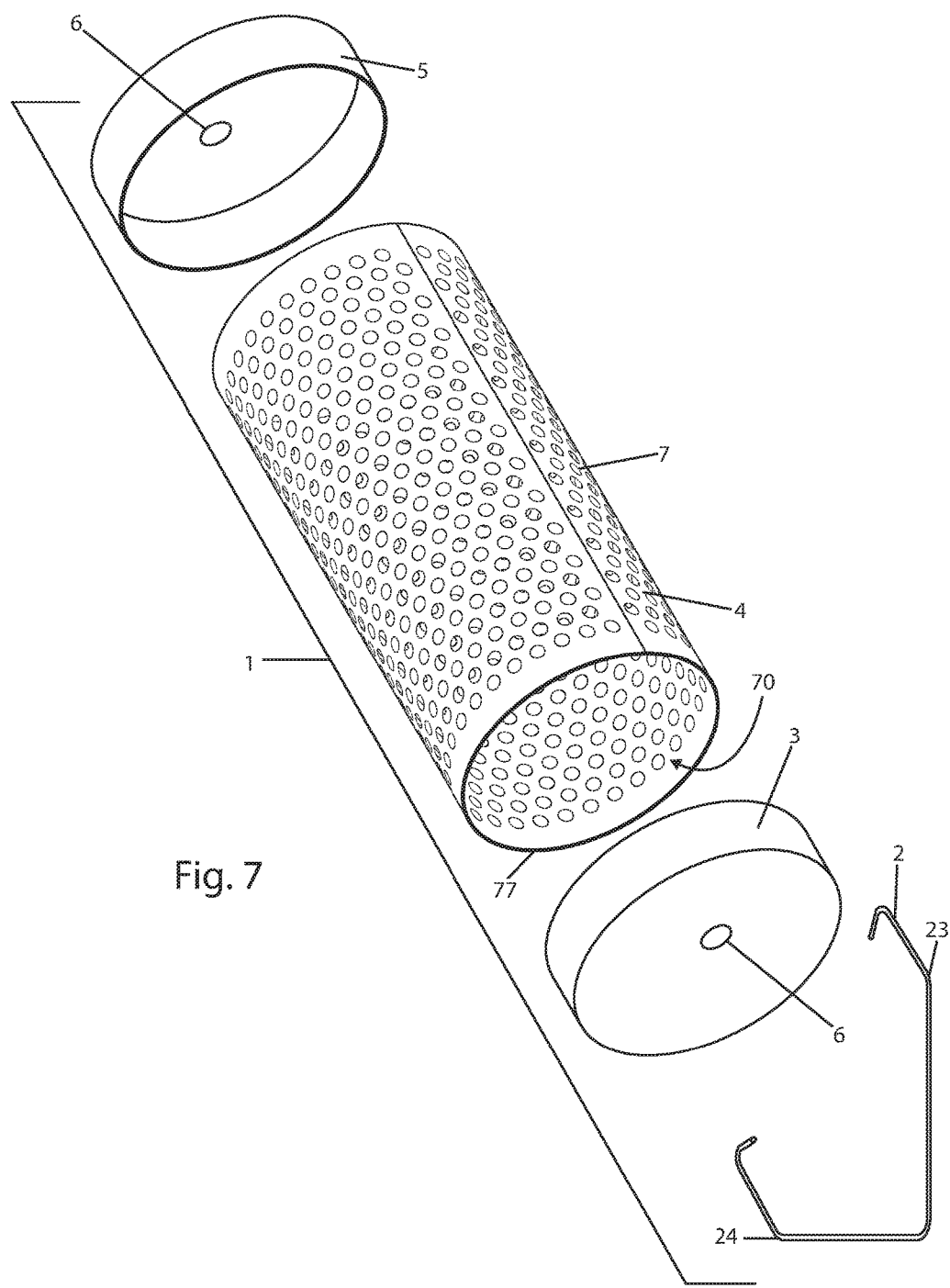
FIG. 7 is an exploded view of the container.

Referring next to FIGS. 5, 6, 7 the top 3 is placed onto rim 71 so as to align the off-center holes 6 to receive a spit 9.

Figure 8:
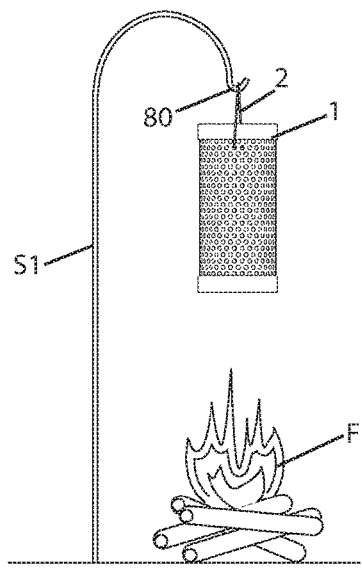
FIG. 8 is a side elevation view of the container in a hanging mode.

In FIG. 8 the handle 2 can be used to hang the container 1 over a fire F. A stand S1 has a hook 80 to support the handle 2.

Figure 9:
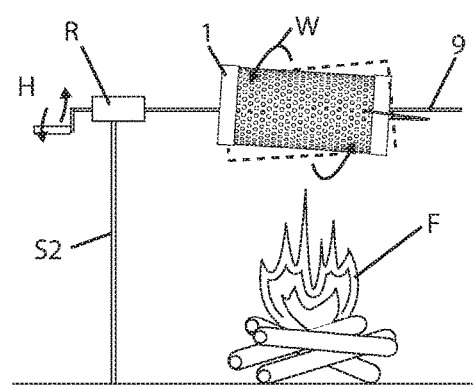
FIG. 9 is a side elevation view of the container in a rotisserie mode.

In FIG. 9 a stand S2 supports a rotating assembly R to allow a user to turn handle H and rotate the spit 9. The dotted outline of the container 1 illustrates the wobbling motion of the container 1 over the fire F.

Figure 10:
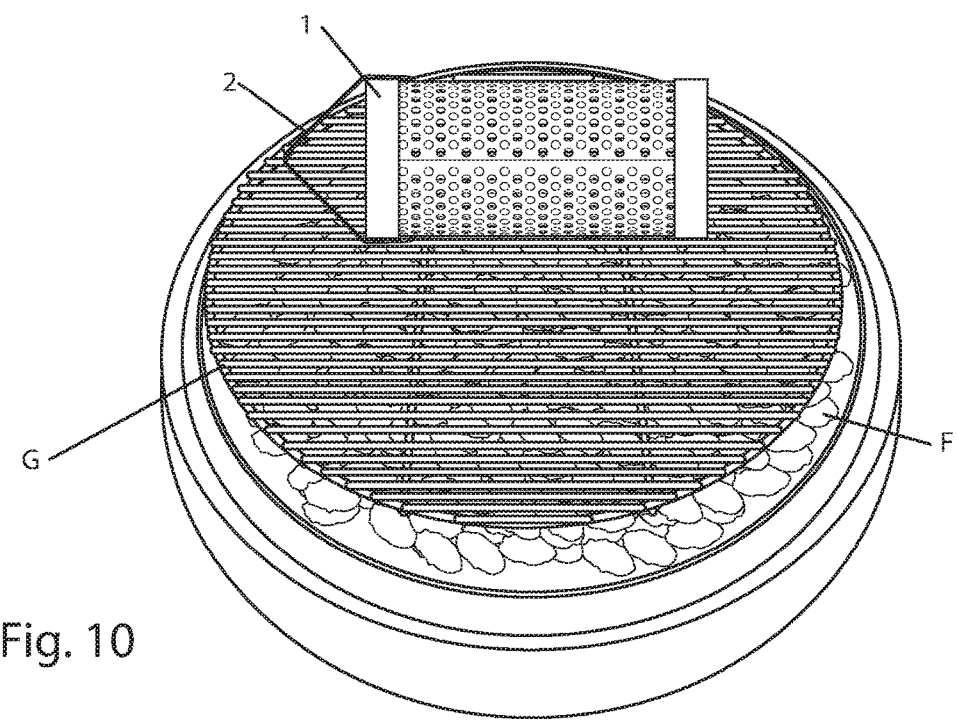
FIG. 10 is a top perspective view of the container in a grill mode.

In FIG. 10 a grill G has a fire F beneath it. The container 1 can be rolled periodically over the grill G using the handle 2.

While a number of exemplifying features and embodiments have been discussed above, those of skill in the art will recognize certain modifications, permutations, additions and subcombinations thereof. No limitation with respect to the specific embodiments disclosed herein is intended or should be inferred.

We claim:

1. A roasting container for use with a barbeque grill, said roasting container comprising:
 a cylindrical tubular housing having a bottom end, a top end, a continuous multi-hole metallic construction of a cylindrical wall and a rod hole off center from a central longitudinal axis of the cylindrical tubular housing;
 said bottom end fixedly coupled to a bottom of the cylindrical tubular housing;
 said rod hole having a drive means functioning to allow a rotating rotisserie rod to drive the bottom end and cylindrical tubular housing in a circular direction;
 said bottom end in combination with the cylindrical side wall form an open chamber with smooth, uninterrupted inner surface to contain a food product;
 said top end having an off center rod hole;
 said top end having a removable coupling to said cylindrical, tubular housing; and
 a top locking means functioning to secure the top end to the cylindrical tubular housing during a cooking operation, wherein the top locking means further comprises a wire hand pivotally mounted on opposing anchors on the cylindrical tubular housing such that raising the wire handle to align with the central longitudinal axis of the cylindrical tubular housing forces opposing shoulders of the wire handle to secure the top against a top circular rim of the cylindrical tubular housing, and moving the wire handle at about perpendicular to the central longitudinal axis moves the opposing shoulders off the top, allowing removal of the top.

2. The roasting container of claim 1, wherein the drive means further compromises a rectangular hole.

3. The roasting container of claim 1, wherein the drive means further compromises a collar with a set screw, and the hole is round.

4. The roasting container of claim 1, wherein the top comprises a solid surface.

5. The roasting container of claim 1 further comprising a rotating rotisserie rod securing the roasting container via the off center rod holes in the top and bottom, wherein the food product is agitated by an of center wobbling movement of the roasting container.

6. The roasting container of claim 1, wherein the multi-hole metallic construction further comprises a sheet metal having a multiplicity of openings formed there through.

7. The roasting container of claim 1, wherein the multi-hole metallic construction further comprises a mesh-like screen.

8. A roasting drum comprising;
 a tubular, cylindrical drum with a metal top comprising a spit hole, a metal bottom comprising a spit hole, a sidewall having a plurality of holes and not having an entry door, and a generally U shaped handle;
 wherein each spit hole on said top and bottom is off-center from a longitudinal axis of the drum so as to provide a wobbling motion of the drum when a spit mounted through the spit holes rotates the drum;
 wherein said top having a flat upper surface which is urged into a locking relationship with a top circular rim of the drum when said U shaped handle having locking shoulders is pivoted up in alignment with the longitudinal axis of the drum; and
 wherein said U shaped handle further comprises an anchor on either side of the drum.

9. The drum of claim 8, wherein the bottom further comprises a collar around the spit hold and a wing screw through the collar.

10. The drum of claim 9, wherein the anchor means further comprises a collar around the spit hole and a wing screw through the collar.

11. A roasting drum comprising;
- a tubular, cylindrical drum with a metal top having a spit hole, a metal bottom having a spit hole, a sidewall having a plurality of holes and not having an entry door, and a U shaped handle;
- wherein each spit hole on said top and bottom is off-center from a longitudinal axis of the drum so as to provide wobbling motion of the drum when a spit mounted through the spit holes rotates the drum;
- wherein said top having a flat upper surface which is urged into a locking relationship with a top circular rim of the drum when the U shaped handle having locking shoulders is pivoted up in alignment with the longitudinal axis of the drum;
- wherein said U shaped handle further comprises an anchor on either side of the drum; and
- wherein moving said U shaped handle at about perpendicular to the longitudinal axis moves the shoulders off the top thereby allowing removal of the top.

12. The drum of claim 11, wherein the U shaped handle further comprises a mechanism to allow the drum to be positioned over a heating source.

13. The drum of claim 12, wherein the mechanism to allow the drum to be positioned over the heating source is substantially hook shaped.

14. The drum of claim 12, wherein the mechanism to allow the drum to be positioned over the heating source also allows the drum to maintain a substantially upright position, wherein the bottom of the drum remains closest to the heating source.

15. The drum of claim 11, wherein the anchors on either side of the drum are pivotable while also remaining permanently affixed to the drum.

16. The drum of claim 11, wherein the bottom comprises a solid surface.

17. The drum of claim 11, wherein the top comprises a solid surface.

* * * * *